(12) United States Patent
Wang et al.

(10) Patent No.: US 12,466,284 B2
(45) Date of Patent: Nov. 11, 2025

(54) BRIDGE STRUCTURE FOR VEHICLES AND ASSOCIATED METHODS

(71) Applicant: Gogoro Inc., Hong Kong (CN)

(72) Inventors: Yu-Jung Wang, Taoyuan (TW); Chen-Hsin Hsu, Taoyuan (TW); Zih-Wei Chen, Taoyuan (TW)

(73) Assignee: GOGORO INC., Hong Kong (CN)

( * ) Notice: Subject to any disclaimer, the term of this patent is extended or adjusted under 35 U.S.C. 154(b) by 185 days.

(21) Appl. No.: 17/523,992

(22) Filed: Nov. 11, 2021

(65) Prior Publication Data

US 2022/0149548 A1 May 12, 2022

Related U.S. Application Data

(60) Provisional application No. 63/112,259, filed on Nov. 11, 2020.

(51) Int. Cl.
*B60L 53/65* (2019.01)
*H01M 10/42* (2006.01)
*H04B 5/20* (2024.01)

(52) U.S. Cl.
CPC ............ *B60L 53/65* (2019.02); *H01M 10/425* (2013.01); *H01R 2201/26* (2013.01); *H04B 5/20* (2024.01)

(58) Field of Classification Search
CPC ...... B60L 53/65; B60L 53/16; H01M 10/425; H01R 2201/26
USPC .......................................................... 320/104
See application file for complete search history.

(56) References Cited

U.S. PATENT DOCUMENTS

| | | | | |
|---|---|---|---|---|
| 8,917,781 B2* | 12/2014 | Murase | ................... | G08C 19/12 |
| | | | | 375/257 |
| 9,461,498 B2* | 10/2016 | Son | ...................... | H02J 7/00045 |
| 12,119,692 B2* | 10/2024 | Zhang | ..................... | B60L 50/64 |
| 2012/0007553 A1* | 1/2012 | Ichikawa | ................ | B60L 53/68 |
| | | | | 320/109 |
| 2012/0166240 A1* | 6/2012 | Jones | ................. | G06Q 10/0631 |
| | | | | 709/227 |
| 2013/0027183 A1 | 1/2013 | Wu et al. | | |
| 2014/0365807 A1 | 12/2014 | Nakano | | |

(Continued)

FOREIGN PATENT DOCUMENTS

| | | | |
|---|---|---|---|
| CA | 3135023 A1 | 10/2020 | |
| CN | 110492320 | * 11/2019 | |

(Continued)

OTHER PUBLICATIONS

European partial search report issued for co-pending EP Application No. 21207693.9, Applicant: Gogoro Inc., Date of Mailing: Apr. 7, 2022, 19 pages.

(Continued)

*Primary Examiner* — Nathaniel R Pelton
(74) *Attorney, Agent, or Firm* — PERKINS COIE LLP

(57) ABSTRACT

A bridge includes a connecting platform, an electrical connector, a wireless communication module, and a processing unit. The electrical connector is disposed on the connecting platform. The wireless communication module is disposed on the connecting platform and configured to receive a wireless signal. The processing unit is configured to: carry out a verification process on information included in the wireless signal; and allow the electrical connector to transmit power when the verification process on the information turned out to be true.

10 Claims, 5 Drawing Sheets

(56) References Cited

U.S. PATENT DOCUMENTS

| | | | |
|---|---|---|---|
| 2016/0368391 A1* | 12/2016 | Kojima | B60L 53/16 |
| 2017/0062993 A1* | 3/2017 | Sumner | H01R 13/6683 |
| 2018/0334052 A1* | 11/2018 | Hwang | H02J 7/0044 |
| 2022/0006223 A1* | 1/2022 | Shigemizu | H01M 50/543 |
| 2022/0224154 A1* | 7/2022 | Lynch | H02J 50/005 |
| 2022/0314819 A1* | 10/2022 | Harvey | H01M 50/284 |

FOREIGN PATENT DOCUMENTS

| | | | |
|---|---|---|---|
| CN | 110492320 | A | 11/2019 |
| JP | 2005285567 | A | 10/2005 |
| KR | 20190001077 | A | 1/2019 |
| TW | I652877 | B | 3/2019 |
| WO | 2008153138 | A1 | 12/2008 |
| WO | 2012172812 | A1 | 12/2012 |
| WO | 2019181669 | A1 | 9/2019 |
| WO | 2020198666 | A2 | 10/2020 |

OTHER PUBLICATIONS

Office Action mailed on Feb. 3, 2023 for India Patent Application No. 202114051549, 8 pages.

Office Action mailed on Jan. 24, 2023 for Japanese Patent Application No. 2021-184003, 8 pages.

European Search Report mailed on Aug. 5, 2022 for European Patent Application No. 21207693.9, 6 pages.

Office Action mailed on Aug. 24, 2022 for Taiwanese Patent Application No. 110141927, 4 pages.

China Office Action mailed Sep. 27, 2024 in App. CN202111333773.8.

Office Action mailed on Feb. 20, 2024 for Philippines Patent Application No. 1/2021/050569, 6 pages.

* cited by examiner

BRIDGE STRUCTURE FOR VEHICLES AND ASSOCIATED METHODS

CROSS-REFERENCE TO RELATED APPLICATION

This application claims priority to U.S. Provisional Application Ser. No. 63/112,259, filed Nov. 11, 2020, which is herein incorporated by reference in its entirety.

BACKGROUND

Technical Field

The present disclosure relates to a bridge, and more particularly, to a bridge for connecting a battery.

Description of Related Art

With the proliferation of electric devices (such as power tools, appliances, personal portable communication devices, laptops and tablets, personal media devices, vehicles, etc.), people's interest in designing battery connection modules has also increased. The conventional battery connection module usually includes a battery holder and a battery connector. The shape of the battery holder is usually designed to match a part of the battery to accommodate the part of the battery. However, the battery holder has a larger size, and the structural design of a vehicle, charger or charging station equipped with such a battery connection module is also limited by the appearance of the battery holder.

In addition, in general, power transmission between a vehicle, a charger or a charging station and a certified battery is a better operating scenario. If the vehicle, charger, or charging station is connected to a non-factory battery, it may be damaged due to the poor quality of the non-factory battery. As a result, the vehicle, charger or charging station may fail to operate normally.

Accordingly, how to provide a bridge to solve the aforementioned problems becomes an important issue to be solved by those in the industry.

SUMMARY

An aspect of the disclosure is to provide a bridge that can efficiently solve the aforementioned problems.

According to an embodiment of the disclosure, a bridge includes a connecting platform, an electrical connector, a wireless communication module, and a processing unit. The electrical connector is disposed on the connecting platform. The wireless communication module is disposed on the connecting platform and configured to receive a wireless signal. The processing unit is configured to: carry out a verification process on information included in the wireless signal; and allow the electrical connector to transmit power when the verification process on the information turned out to be true.

In an embodiment of the disclosure, the connecting platform has an abutting surface and a groove recessed from the abutting surface. The electrical connector protrudes from the abutting surface. The wireless communication module includes an antenna. The antenna is accommodated in the groove.

In an embodiment of the disclosure, the bridge further includes a protective cover. The protective cover covers the wireless communication module.

In an embodiment of the disclosure, the protective cover is flush with the abutting surface of the connecting platform.

In an embodiment of the disclosure, the antenna surrounds the electrical connector.

In an embodiment of the disclosure, the wireless communication module further includes a matching board. The matching board is connected to the antenna and configured to adjust a communication frequency of the antenna.

In an embodiment of the disclosure, the bridge further includes a connection detector. The connection detector is disposed on the connecting platform, and is configured to be triggered to generate a trigger signal and transmit the trigger signal to the processing unit. The processing unit is further configured to carry out the verification process on the information upon receiving the trigger signal.

In an embodiment of the disclosure, the connection detector includes a detecting switch and an elastic member. The detecting switch is disposed on the connecting platform. The elastic member covers the detecting switch. The detecting switch is configured to be triggered by a deformation of the elastic member caused by an outside force to generate the trigger signal.

In an embodiment of the disclosure, the connecting platform has an abutting surface. The electrical connector and the connection detector protrude from the abutting surface.

In an embodiment of the disclosure, the verification process includes at least one of following steps: determining whether a battery manufacturer data included in the information meets a predetermined list; determining whether a battery status/health data included in the information meets a battery status/health standard; determining whether a charging history data included in the information meets a standard for number of charging times; and determining whether a battery type data included in the information meets a subscription plan.

Accordingly, in the bridge of the present disclosure, the processing unit can carry out a verification process on the wireless signal received from an external battery by the wireless communication module, and only allow the electrical connector and the external battery to transmit power when the verification process on the information turned out to be true. In this way, the charging and discharging of the external battery can be managed and controlled, and the device (such as a vehicle, a charger, or a charging station) equipped with the bridge can be prevented from being damaged due to the poor and uncontrolled quality of unverified external batteries. In addition, instead of the conventional battery holder, the connecting platform is chosen for accommodating a part of the external battery in the bridge of the present disclosure. Therefore, the bridge has a smaller overall size, which can effectively reduce the restriction on the structural design of the device equipped with the bridge.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
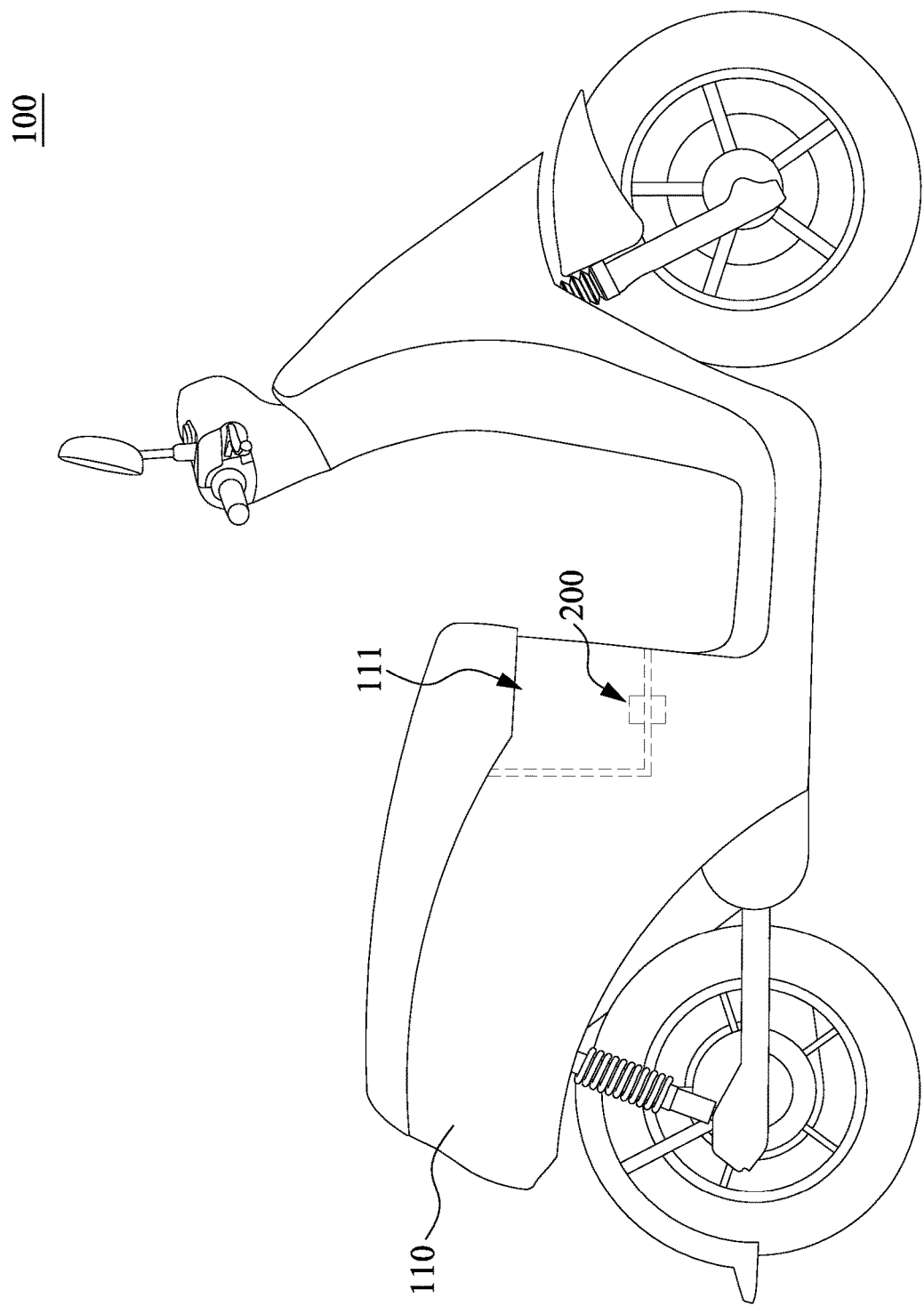
FIG. 1 is a side view of a vehicle according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a side view of a vehicle 100 according to an embodiment of the present disclosure. As shown in FIG. 1, the vehicle 100 (for example, a straddle-type vehicle) includes a housing 110 and a bridge 200. The housing 110 has an accommodating space 111, and the bridge 200 is disposed in the accommodating space 111 of the housing 110. In some embodiments, the accommodating space 111 serves as a battery compartment for accommodating external batteries, and the bridge 200 is configured to establish an electrical connection between the power system of the vehicle 100 and the battery pack.

Figure 2:
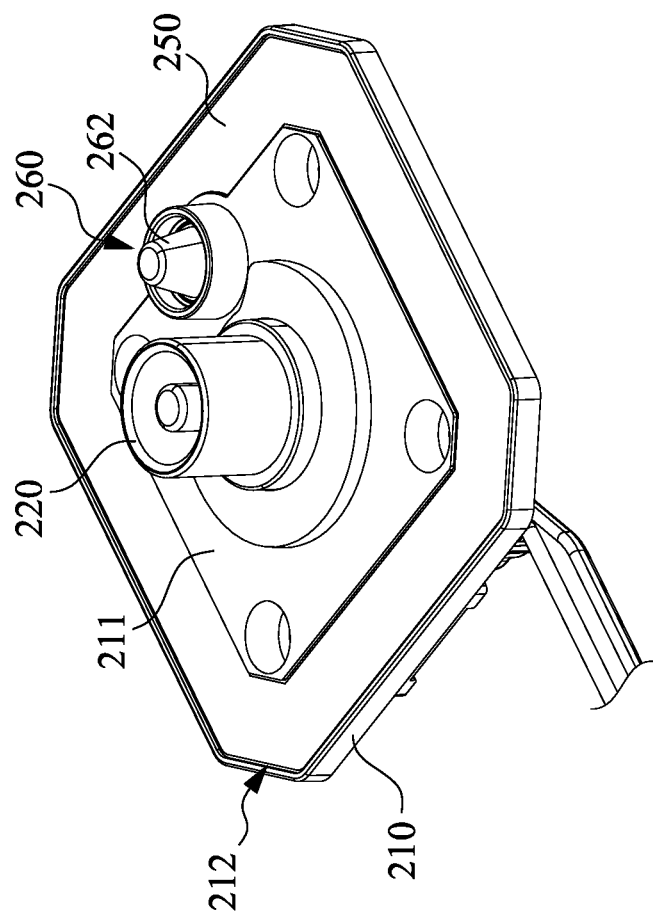
FIG. 2 is a perspective view of a bridge according to an embodiment of the present disclosure.
Figure 3:
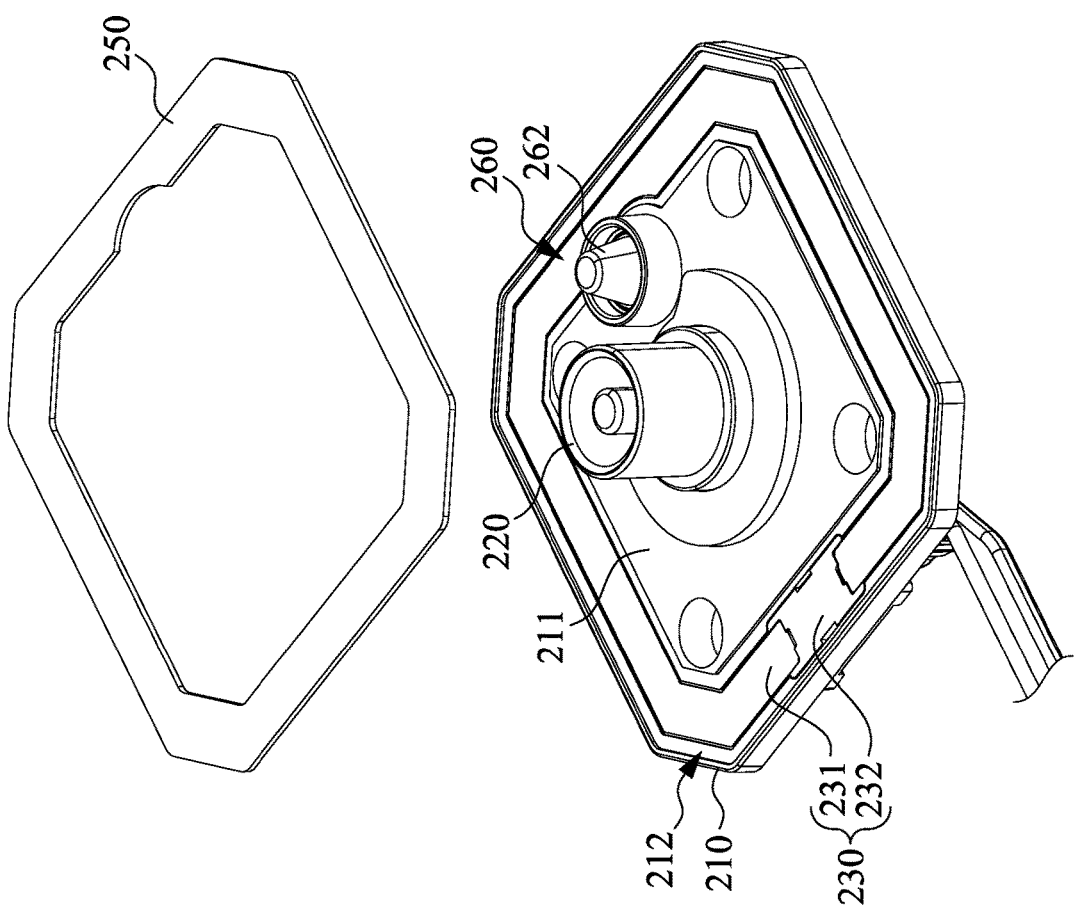
FIG. 3 is another perspective view of the bridge in FIG. 2, in which a protective cover is separately displayed.

Reference is made to FIGS. 2 and 3. FIG. 2 is a perspective view of the bridge 200 according to an embodiment of the present disclosure. FIG. 3 is another perspective view of the bridge 200 in FIG. 2, in which a protective cover 250 is separately displayed. As shown in FIGS. 2 and 3, in the present disclosure, the bridge 200 includes a connecting platform 210 and an electrical connector 220. The connecting platform 210 has an abutting surface 211. The abutting surface 211 is configured to abut against an external battery (not shown). In other words, the abutting surface 211 can be used as a support surface for the external battery. The electrical connector 220 is disposed on the connecting platform 210 and protrudes from the abutting surface 211 of the connecting platform 210. Therefore, when the external battery abuts against the abutting surface 211 of the connecting platform 210, the electrical connector 220 can be plugged into the external battery to be electrically connected.

Compared with the conventional battery holder for accommodating a part of the external battery, the bridge 200 of the present embodiment that replaces the conventional battery holder with the connecting platform 210 can have a smaller overall size, thereby effectively reducing the restriction on the structural design of the device equipped with the bridge 200.

As shown in FIG. 3, in the present disclosure, the bridge 200 further includes a wireless communication module 230. The wireless communication module 230 is disposed on the connecting platform 210. Specifically, the connecting platform 210 further has a groove 212 recessed from the abutting surface 211. The wireless communication module 230 includes an antenna 231. The antenna 231 is accommodated in the groove 212. In this way, the wireless communication module 230 can receive the wireless signal (e.g., the wireless signal sent by a communication module installed on the external battery) through the antenna 231. For example, the wireless communication module 230 may be an NFC (Near-field communication) card reader, which can read information of an NFC module installed on the external battery.

In some embodiments, the antenna 231 is ring-shaped and surrounds the electrical connector 220. Correspondingly, the groove 212 of the connecting platform 210 is also ring-shaped. In this way, no matter in which orientation the external battery is connected to the electrical connector 220, the communication module disposed on the external battery can be aligned with a part of the antenna 231 up and down, so that the signal strength of the wireless signal received from the communication module of the external battery by the antenna 231 can be ensured.

As shown in FIG. 3, in the present disclosure, the bridge 200 further includes a protective cover 250. The protective cover 250 covers the wireless communication module 230. Specifically, the protective cover 250 covers the antenna 231 of the wireless communication module 230 and is ring-shaped, so as to fitly cover the opening of the groove 212 of the connecting platform 210. In this way, the antenna 231 of the wireless communication module 230 can be protected by the protective cover 250, thereby effectively preventing the antenna 231 from being worn by the external battery.

In some embodiments, a material of the protective cover 250 includes plastic, but the present disclosure is not limited in this regard. For example, the protective cover 250 may be a piece of Mylar, but the disclosure is not limited in this regard.

In some embodiments, the protective cover 250 is flush with the abutting surface 211 of the connecting platform 210. With this configuration, the bridge 200 can abut against the external battery with the abutting surface 211 and the protective cover 250 at the same time, so as to improve stability when the external battery abuts against the bridge 200.

Figure 4:
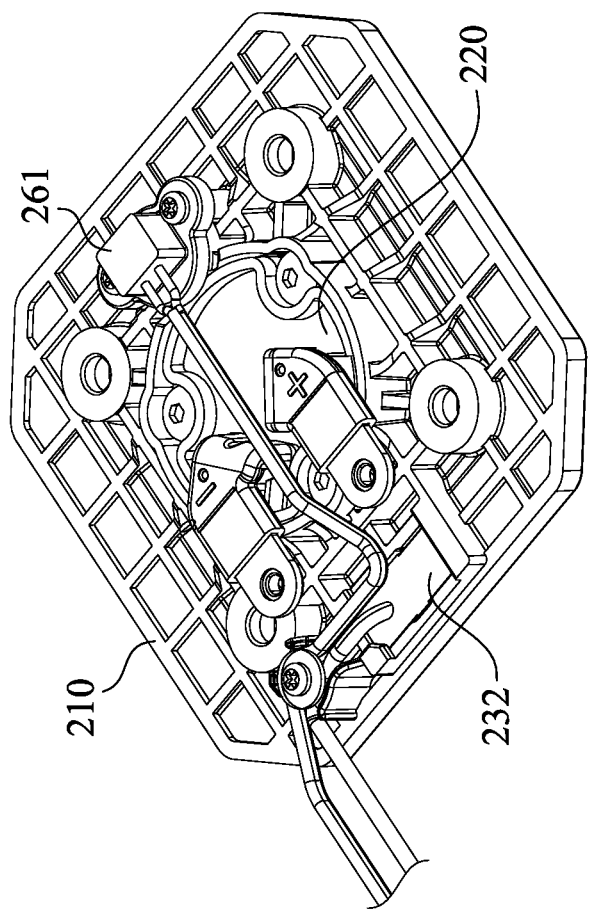
FIG. 4 is another perspective view of the bridge in FIG. 2.

Reference is made to FIG. 4. FIG. 4 is another perspective view of the bridge 200 in FIG. 2. As shown in FIGS. 3 and 4, in the present embodiment, the wireless communication module 230 further includes a matching board 232. The matching board 232 is connected to the antenna 231 and configured to adjust a communication frequency of the antenna through the operation of internal circuit, so as to make the wireless communication module 230 meet the predetermined factory standard.

Figure 5:
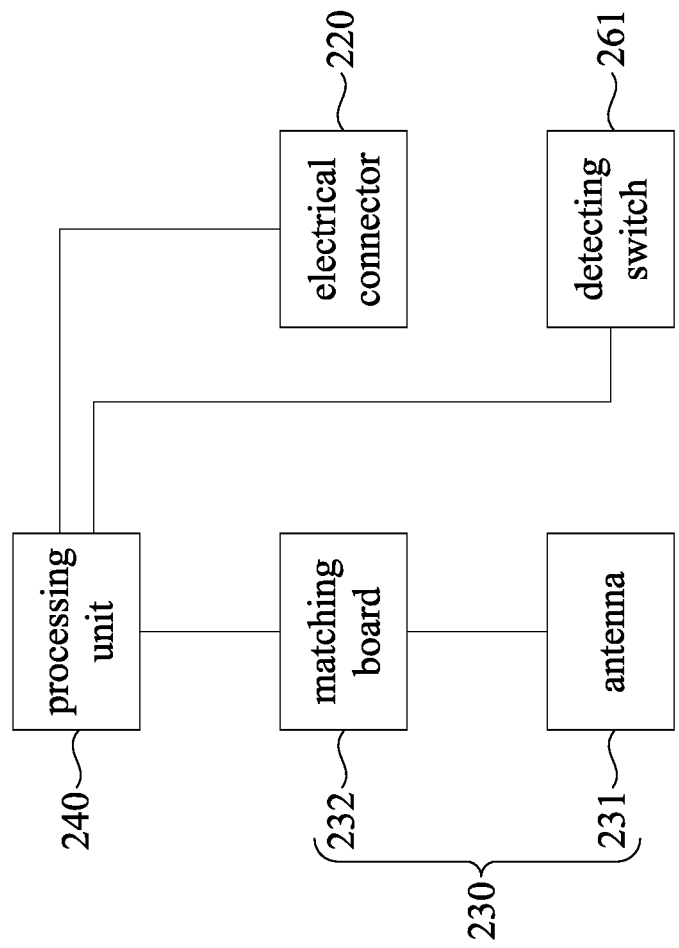
FIG. 5 is a functional block diagram of the bridge according to an embodiment of the present disclosure.

Reference is made to FIG. 5. FIG. 5 is a functional block diagram of the bridge 200 according to an embodiment of the present disclosure. As shown in FIG. 5, in the present embodiment, the bridge 200 further includes a processing unit 240. The processing unit 240 may be disposed at any position on the housing 110 and connected to the electrical connector 220 and the matching board 232 of the wireless communication module 230. The processing unit 240 is configured to carry out a verification process on information included in the wireless signal. The processing unit 240 is further configured to allow the electrical connector 220 to transmit power when the verification process on the information turned out to be true. On the contrary, the processing unit 240 is further configured to not allow the electrical connector 220 to transmit power when the verification process on the information turned out to be false.

It can be seen that the processing unit 240 can carry out the verification process on the wireless signal received from the external battery by the wireless communication module 230, and only allow the electrical connector 220 to transmit power with the external battery when the verification process on the information turned out to be true. In this way, it is possible to prevent the device (such as the vehicle 100, a charger or a charging station) equipped with the bridge 200 from being damaged due to the poor quality of the unverified external battery.

In some embodiments, the verification process includes determining whether a battery manufacturer data included in the information meets a predetermined list. For example, the predetermined list may include the provider of the vehicle 100. If the battery manufacturer data included in the information is consistent with the provider of the vehicle 100, the verification process turned out to be true.

In some embodiments, the verification process includes determining whether a battery status/health data included in the information meets a battery status/health standard. In some embodiments, the verification process includes determining whether a charging history data included in the information meets a standard for number of charging times. In some embodiments, the verification process includes determining whether a battery type data included in the information meets a subscription plan. It should be noted that the verification process is not limited to the above-mentioned embodiments.

As shown in FIGS. 2, 4, and 5, in the present embodiment, the bridge 200 further includes a connection detector 260. The connection detector 260 is disposed on the connecting platform 210, and is configured to be triggered to generate a trigger signal. By designing the position of the connection detector 260 on the connecting platform 210 (for example, the connection detector 260 protrudes from the abutting surface 211) to make the connection detector 260 generate the trigger signal when the external battery abuts against the abutting surface 211 of the connecting platform 210, the generation of the trigger signal can be used as an indication signal indicating that the bridge 200 is connected to the external battery. After the connection detector 260 generates the trigger signal, it will be sent to the processing unit 240. The processing unit 240 is further configured to carry out the verification process on the information of the wireless signal when receiving the trigger signal. In this way, the processing unit 240 can carry out the verification process only when the bridge 200 is connected to the external battery, thereby reducing the operating burden of the processing unit 240.

As shown in FIGS. 2 and 4, in the present embodiment, the connection detector 260 includes a detecting switch 261 and an elastic member 262. The detecting switch 261 is disposed on the connecting platform 210. The elastic member 262 covers the detecting switch 261. The detecting switch 261 is configured to be triggered by the deformed elastic member 262 (e.g., pressed by the external battery) to generate the trigger signal. In other words, the detecting switch 261 is a contact switch and can generate the trigger signal when it receives a physical contact.

In some other embodiments, the detecting switch 261 of the connection detector 260 may be a non-contact switch. For example, the detecting switch 261 may be a reed switch, a photo-interrupter switch, etc., but the present disclosure is not limited in this regard.

In some embodiments, a material of the elastic member 262 includes rubber, but the present disclosure is not limited in this regard.

In some embodiments, any number of the bridges 200 can be connected in series, and these bridges 200 can share the same processing unit 240. Therefore, the bridge 200 of the present disclosure also has the feature of high scalability. In addition to being installed on electric vehicles, the bridge 200 can also be installed in any system that uses rechargeable batteries, such as charging stations, street lights, generators, uninterruptible power systems, power tools, and so on.

According to the foregoing recitations of the embodiments of the disclosure, it can be seen that in the bridge of the present disclosure, the processing unit can carry out a verification process on the wireless signal received from an external battery by the wireless communication module, and only allow the electrical connector and the external battery to transmit power when the verification process on the information turned out to be true. In this way, the charging and discharging of the external battery can be managed and controlled, and the device (such as a vehicle, a charger, or a charging station) equipped with the bridge can be prevented from being damaged due to the poor and uncontrolled quality of unverified external batteries. In addition, instead of the conventional battery holder, the connecting platform is chosen for accommodating a part of the external battery in the bridge of the present disclosure. Therefore, the bridge has a smaller overall size, which can effectively reduce the restriction on the structural design of the device equipped with the bridge.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A bridge for connecting an external battery, comprising:
    a connecting platform comprising an abutting surface opposite to a bottom surface;
    an electrical connector disposed on the connecting platform and used to electrically connect to the external battery when the external battery abuts against the abutting surface;
    a connection detector disposed on and extending through the connecting platform from the abutting surface to the bottom surface;
    a wireless communication module disposed on the connecting platform and configured to receive a wireless signal from the external battery; and
    a processing unit configured to:
        carry out a verification process on information included in the wireless signal; and
        allow the electrical connector to transmit power when the verification process on the information turned out to be true, wherein the verification process comprises determining whether a charging history data included in the information meets a standard for number of charging times,
    wherein the connection detector comprises:
        a detecting switch disposed on the connecting platform and extending from the abutting surface to the bottom surface.

2. The bridge of claim 1, wherein the connecting platform has a groove recessed from the abutting surface, the electrical connector protrudes from the abutting surface for plugging into the external battery to when the external battery abuts against the abutting surface, the wireless communication module comprises an antenna, and the antenna is accommodated in the groove.

3. The bridge of claim 2, further comprising a protective cover covering the wireless communication module.

4. The bridge of claim 3, wherein the protective cover is flush with the abutting surface of the connecting platform.

5. The bridge of claim 2, wherein the antenna surrounds the electrical connector.

6. The bridge of claim 2, wherein the wireless communication module further comprises a matching board, and the matching board is connected to the antenna and configured to adjust a communication frequency of the antenna.

7. The bridge of claim 1, wherein the connection detector is configured to be triggered to generate a trigger signal and transmit the trigger signal to the processing unit, wherein the processing unit is further configured to carry out the verification process on the information upon receiving the trigger signal.

8. The bridge of claim 7, wherein the connection detector comprises:
    an elastic member covering the detecting switch,
    wherein the detecting switch is configured to be triggered by a deformation of the elastic member caused by an outside force to generate the trigger signal.

9. The bridge of claim 7, wherein the electrical connector and the connection detector protrude from the abutting surface.

10. The bridge of claim 1, wherein the verification process comprises at least one of following steps:
    determining whether a battery manufacturer data included in the information meets a predetermined list;
    determining whether a battery status/health data included in the information meets a battery status/health standard;
    and
    determining whether a battery type data included in the information meets a subscription plan.

* * * * *